United States Patent
Pearcy et al.

(10) Patent No.: US 9,330,072 B1
(45) Date of Patent: May 3, 2016

(54) SERVING CONTENT FOR A SPACE BASED ON A PROBABILISTIC DISTRIBUTION

(71) Applicants: Brandon Murdock Pearcy, San Francisco, CA (US); Nathan Peter Lucash, San Francisco, CA (US); Girish Deodhar, Cupertino, CA (US)

(72) Inventors: Brandon Murdock Pearcy, San Francisco, CA (US); Nathan Peter Lucash, San Francisco, CA (US); Girish Deodhar, Cupertino, CA (US)

(73) Assignee: Google Inc., Mountain View, CA (US)

( * ) Notice: Subject to any disclaimer, the term of this patent is extended or adjusted under 35 U.S.C. 154(b) by 471 days.

(21) Appl. No.: 13/627,334

(22) Filed: Sep. 26, 2012

(51) Int. Cl.
*G06F 17/00* (2006.01)
*G06F 17/22* (2006.01)
*G06F 17/24* (2006.01)

(52) U.S. Cl.
CPC ............ *G06F 17/2247* (2013.01); *G06F 17/24* (2013.01)

(58) Field of Classification Search
CPC .............................. G06F 17/2247; G06F 17/24
See application file for complete search history.

(56) References Cited

U.S. PATENT DOCUMENTS

| | | | |
|---|---|---|---|
| 5,379,229 A | 1/1995 | Parsons et al. | |
| 5,555,369 A | 9/1996 | Menendez et al. | |
| 6,820,277 B1 | 11/2004 | Eldering et al. | |
| 7,263,668 B1 | 8/2007 | Lentz | |
| 7,594,189 B1 | 9/2009 | Walker et al. | |
| 7,694,221 B2 * | 4/2010 | Fortes | 715/249 |
| 7,890,882 B1 | 2/2011 | Nelson | |
| 7,904,799 B1 | 3/2011 | Underwood et al. | |
| 7,983,959 B2 | 7/2011 | Chickering et al. | |
| 8,001,105 B2 | 8/2011 | Bolivar et al. | |
| 8,086,957 B2 | 12/2011 | Bauchot et al. | |
| 8,090,706 B2 | 1/2012 | Bharat | |
| 8,196,162 B2 | 6/2012 | Van De Klashorst | |
| 8,214,454 B1 | 7/2012 | Barnes et al. | |
| 8,335,712 B1 | 12/2012 | Crucian et al. | |
| 8,577,181 B1 | 11/2013 | Badros et al. | |
| 8,738,448 B2 * | 5/2014 | Zhang | 705/14.73 |

(Continued)

FOREIGN PATENT DOCUMENTS

| | | |
|---|---|---|
| EP | 2 068 251 A2 | 10/1995 |
| JP | 2012-073863 A | 4/2012 |

(Continued)

OTHER PUBLICATIONS

US Office Action on U.S. Appl. No. 13/725,302, dated Jun. 4, 2014, 21 pages.

(Continued)

*Primary Examiner* — Stephen Hong
*Assistant Examiner* — Marshon Robinson
(74) *Attorney, Agent, or Firm* — John D. Lanza; Foley & Lardner LLP

(57) ABSTRACT

Variations in user devices may result in content being rendered differently. Knowing the amount of space required to render the content item for a user device may allow more content to be shown. In one implementation, measurement results of rendering content items from user devices with various configurations may be obtained by running scripts on the user devices. A space need of the content items may be determined based on the measurement results. The determination may include determining a probabilistic distribution of a representation of space needed for the content items. A request for a content item for display in a slot of a web page may be received and a content item may be transmitted based on the probabilistic distribution that represents a percentage of content items that are truncated when displayed in the slot.

20 Claims, 5 Drawing Sheets

(56) References Cited

U.S. PATENT DOCUMENTS

| | | |
|---|---|---|
| 2004/0073873 A1 | 4/2004 | Croney et al. |
| 2004/0148274 A1 | 7/2004 | Warnock et al. |
| 2004/0267965 A1* | 12/2004 | Vasudevan et al. ........... 709/250 |
| 2005/0021403 A1 | 1/2005 | Ozer et al. |
| 2005/0028098 A1 | 2/2005 | Harrington et al. |
| 2005/0041647 A1 | 2/2005 | Stinnie |
| 2006/0064630 A1 | 3/2006 | Balinsky |
| 2006/0107204 A1 | 5/2006 | Epstein |
| 2007/0162844 A1 | 7/2007 | Woodall et al. |
| 2007/0174291 A1* | 7/2007 | Cooper et al. ................. 707/10 |
| 2007/0226626 A1 | 9/2007 | Yap et al. |
| 2008/0262912 A1 | 10/2008 | Gargi |
| 2008/0262913 A1* | 10/2008 | Reitz et al. ..................... 705/14 |
| 2008/0270890 A1 | 10/2008 | Stern |
| 2009/0012863 A1 | 1/2009 | Saephan |
| 2009/0012905 A1 | 1/2009 | Mawani et al. |
| 2009/0063377 A1 | 3/2009 | Brady et al. |
| 2009/0067753 A1 | 3/2009 | Hanechak |
| 2009/0070211 A1 | 3/2009 | Gonen |
| 2009/0085921 A1* | 4/2009 | Do et al. ...................... 345/543 |
| 2009/0150253 A1 | 6/2009 | Williams et al. |
| 2009/0171920 A1 | 7/2009 | Wade et al. |
| 2009/0172730 A1 | 7/2009 | Schiff et al. |
| 2009/0187535 A1 | 7/2009 | Warnock et al. |
| 2009/0216364 A1 | 8/2009 | Grissom |
| 2009/0234713 A1 | 9/2009 | Bi et al. |
| 2009/0307188 A1 | 12/2009 | Oldham et al. |
| 2010/0042749 A1 | 2/2010 | Barton |
| 2010/0057569 A1 | 3/2010 | Cantelmo et al. |
| 2010/0114696 A1 | 5/2010 | Yang |
| 2010/0115064 A1 | 5/2010 | Tsun et al. |
| 2010/0198694 A1 | 8/2010 | Muthukrishnan |
| 2011/0007096 A1 | 1/2011 | Miyano |
| 2011/0035345 A1 | 2/2011 | Duan et al. |
| 2011/0119124 A1 | 5/2011 | Pradeep et al. |
| 2011/0145730 A1 | 6/2011 | Zhou |
| 2011/0153421 A1 | 6/2011 | Novikov et al. |
| 2012/0310735 A1 | 12/2012 | Kniaz et al. |
| 2013/0018734 A1 | 1/2013 | Perret |
| 2013/0024757 A1 | 1/2013 | Doll et al. |
| 2013/0305144 A1* | 11/2013 | Jackson et al. ................ 715/246 |
| 2014/0006174 A1 | 1/2014 | Pearcy et al. |
| 2014/0095514 A1 | 4/2014 | Filev et al. |

FOREIGN PATENT DOCUMENTS

| | | |
|---|---|---|
| WO | WO-02/27574 A1 | 4/2002 |
| WO | WO-2006/055751 A2 | 5/2006 |
| WO | WO-2009/111123 A1 | 9/2009 |
| WO | WO-2010/088479 A2 | 8/2010 |

OTHER PUBLICATIONS

International Search Report and Written Opinion mailed Mar. 27, 2014 in PCT Application No. PCT/US2013/074279, 11 pages.

US Office Action on U.S. Appl. No. 13/725,302 mailed Oct. 28, 2014, 24 pages.

Office Action on U.S. Appl. No. 13/724,391 dated Jan. 13, 2015.

Office Action on U.S. Appl. No. 13/724,391 dated Aug. 13, 2014.

PCT International Search Report/Written Opinion for PCT/US2013/074276, DTD Mar. 28, 2014, 9 pages.

US Advisory Action on U.S. Appl. No. 13/725,302, dtd May 26, 2015, 3 pages.

US Notice of Allowance on U.S. Appl. No. 13/659,520 dtd Jul. 6, 2015.

US Notice of Allowance on U.S. Appl. No. 13/724,391 DTD Jul. 7, 2015, 11 pages.

US Notice of Allowance on U.S. Appl. No. 13/659,520 DTD Mar. 13, 2015, 12 pages.

US Office Action on U.S. Appl. No. 13/725,302 DTD Mar. 20, 2015, 27 pages.

U.S. Appl. No. 13/627,272, dtd Oct. 22, 2015, 21 pgs.

* cited by examiner

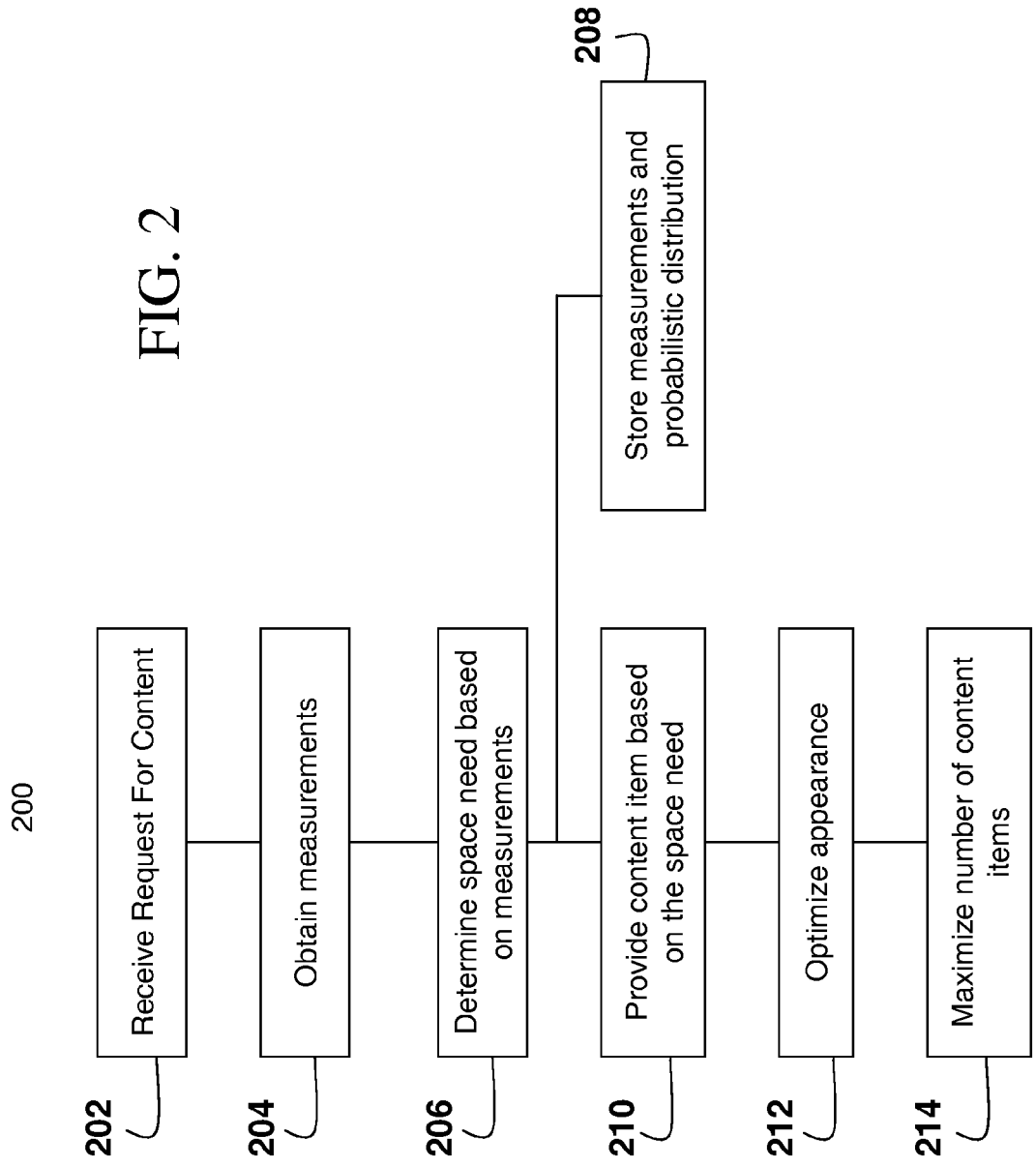

SERVING CONTENT FOR A SPACE BASED ON A PROBABILISTIC DISTRIBUTION

BACKGROUND

In a networked environment such as the Internet, entities such as people or companies can provide information for display on web pages. The web pages can include text, video, or audio information provided by the entities via a web page server. Additional or alternative content such as advertisements may be provided by third parties for display on the web pages together with the main content. Thus, a user viewing a web page can access the information that is the subject of the web page, as well as third party advertisements that may or may not be related to the subject matter of the web page.

SUMMARY

At least one aspect is directed toward a method of distributing content items to a web page via a computer network. The method includes obtaining measurement results of rendering content items from user devices with multiple configurations that are obtained from scripts running on the user devices. The method may include determining a space need of the content items based on the measurement results. The determination may include determining a probabilistic distribution of a representation of space needed for the content items. The method may include receiving a request for a content item for display in a slot of a web page. The method may include transmitting the content item for rendering in the slot based on the probabilistic distribution that represents a percentage of content items that are truncated when displayed in the slot.

At least another aspect is directed to a system for distributing content items to a web page via a computer network. The system includes one or more data processors and one or more storage devices storing instructions that, when executed by the one or more data processors, cause the one or more data processors to perform operations of obtaining measurement results of rendering content items from multiple user devices multiple configurations. The measurement results may be obtained from scripts running on the multiple user devices and may experiment with user interface dimensions on the user devices. The instructions may cause the one or more data processors to perform operations of determining a space need of the content items based on the measurement results. The instructions may cause the one or more data processors to perform operations of receiving a request for a content item for display in a slot of a web page. The instructions may cause the one or more data processors to perform operations of transmitting the content item for rendering in the slot based on the probabilistic distribution. The space need may be represented by a probabilistic distribution indicating a percentage of content items that are truncated when displayed in the slot.

At least another aspect is directed to a computer readable storage device storing instructions that, when executed by one or more data processors, cause the one or more data processors to perform operations of receiving a request for a content item for display in a slot of a web page. The instructions may cause the one or more data processors to perform operations of obtaining measurement results of rendering content items from multiple user devices with multiple configurations. The measurement results may be obtained from scripts running on the user devices. The instructions may cause the one or more data processors to perform operations of determining a space need of the content items based on the measurement results. The space need may be represented by a probabilistic distribution indicating a percentage of content items that are truncated when displayed in the slot. The instructions may cause the one or more data processors to perform operations of providing the content item for rendering in the slot based on the probabilistic distribution.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

FIG. 2 is a flowchart illustrating an example method of distributing content to a web page via a computer network, according to some implementations;

DETAILED DESCRIPTION

Figure 1A:
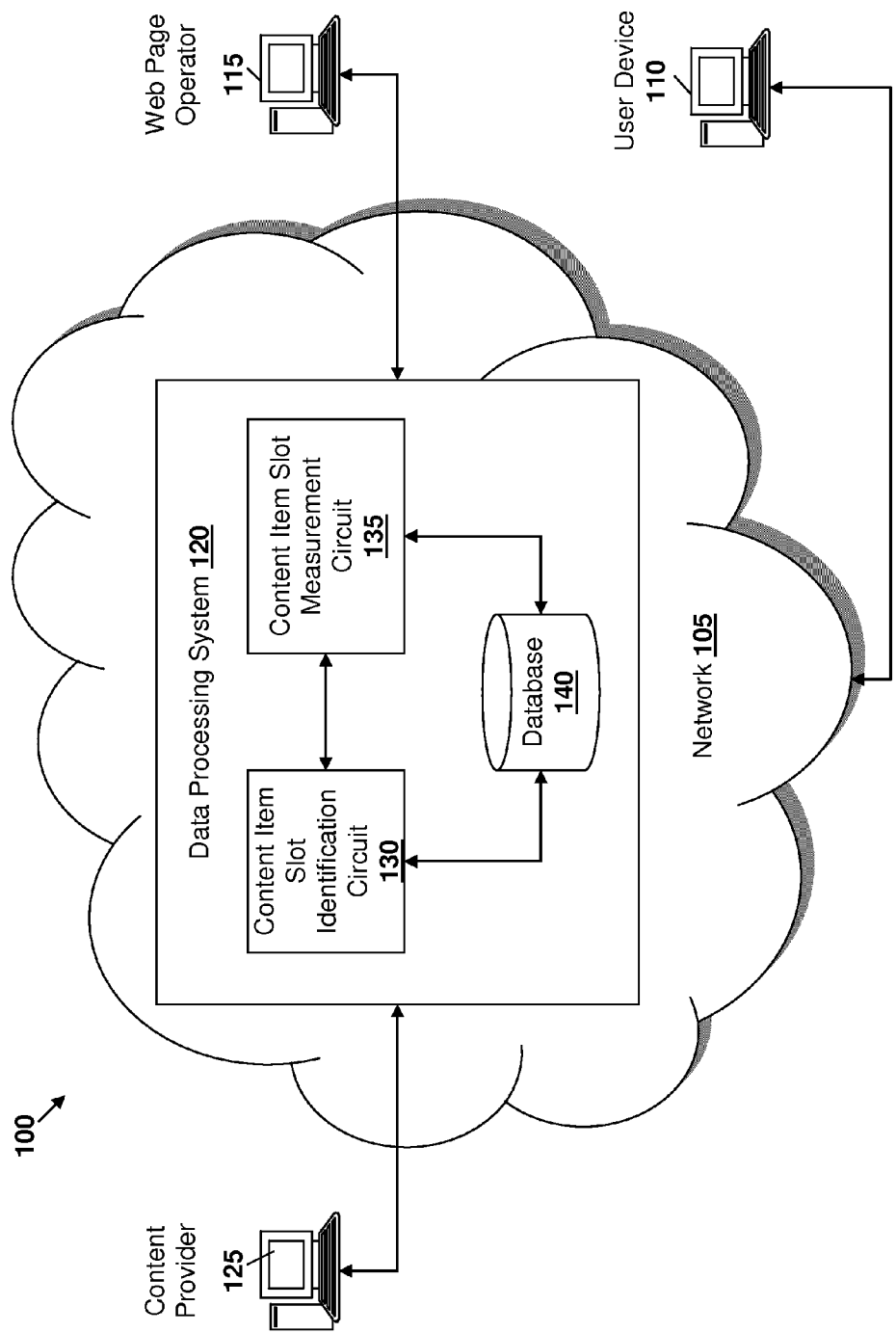
FIG. 1A is an illustration of an example system for distributing content to a web page via a computer network, according to some implementations.

Systems and methods described herein are directed to distributing online content items to a web page based on information about sizes of the content items and parameters related to the web pages such as a position on the web page, a size of an allocated space on the web page, or a browser type, etc.

In an advertising environment, an ad slot may be an area of a web page or application that has been made available for displaying ads. Different ad slots may represent different sections of a web page or application, or different placements for content within a single web page or application. An ad slot can display a plurality of types of content, including, e.g., an advertisement, video, images, and text.

Knowledge of the size of a content item (e.g., ad) may be needed for determining how many content items to request to fill a space of a specified size (e.g., slot) on a web page. The exact space need may depend on the precise textual content in a given content item, and may depend on the platform on which the content item is being displayed or viewed (e.g., different web browser versions may have different rendering logics), the fonts being used, user device screen resolution, the layout of the various components of the ad, etc. Knowing the space needed for content items may help optimize monetization of limited space on web pages without truncating the ads, may help optimize the appearance of the content items (e.g., a content item can be displayed with a larger font size), and so on.

As used herein, a "user" or a "user identifier" may refer to an identifier of an individual user, a user device, a user browser, etc., and does not necessarily refer to the actual individual user. Users may opt out of data collection, and users may opt in to provide additional demographic data for improved online experience. The identifiers associated with user data may be anonymized and not connected to user names or actual identities, or other sensitive information. Similarly, user devices (e.g., browsers) may not be connected to actual identifies of the users.

According to some of the described implementations, scripts may be run on user devices (e.g., on browsers) to make measurements across a random sample of textual content items. The scripts can run a measurement process on the content items that were served in a real-life setting on all available platform configurations. The scripts can then report back to a server a representation of the space needed for each displayed textual content item for a variety of display options or parameters (font-size, font-face, font-style, constrained widths/heights, etc.) In some implementations, Java scripts are adopted, which may be sufficient to run across different platforms.

When a user identifier makes a request for content items, the user device (e.g., using a browser) can download and run a script, and send information back to the server. For example, the user device (e.g., using a browser) can (invisibly) vary a user interface (UI) dimension of a content item already returned by the server, and send measurement data back to the server. The script can perform the sampling, and make measurements across different platforms in real time. The processing of the information can be offline. The system can log the data for future processing. The processing may take these logs as input, producing a set of distributions. A curve generation algorithm may generate "truncation curves" based on the distributions, which indicate the probability of content items being truncated when rendered to ad slots.

In some implementations, a separate process may take the truncation curves as input to generate distributions under various conditions. For example, the produced truncation curves may pertain to a single content item. Using a statistical approach in a computer model, or through the direct measurements/experiments on user devices (e.g., on browsers), truncation curves may be obtained for situations where two content items, three content items, four content items, etc., are displayed in one slot. This process may be performed in conjunction with existing requests for content items, but may be limited to a selected percentage of user identifiers.

In some alternative implementations, instead of running at a variety of configurations, a script can report the status of the current, single, display. Such a status may include, for example, the size of the content item being shown, whether the content item is truncated, etc. This approach may yield less information as compared with the statistical approaches described above, but may be able to effectively advise reasonable display configurations. Such display configurations may include, for example, content items shown in a specifically-sized space (e.g., rectangular space), in a specific font, to web browsers that truncate for a specific probability (e.g., 4% of the time.)

The described implementations can be applied not only to advertising, but to search results or any other content rendering systems. For example, parameters of a browser can be gathered, and fonts can be measured, and these factors can be taken into account in rendering digital books, displaying search results page (e.g., how many lines are shown on one page; how to fold search result pages, etc.). The methods may be particularly useful for devices with limited display spaces, such as mobile phones, and tablet computers.

In some implementations, a content item may have variable size and/or appearance, etc. For example, the content item may include an expandable advertisement. If the ad slot is a horizontal ad slot on the top of the web page, then the content placement server may prevent clipping of the ad by selecting an ad that expands towards the bottom of the page instead of the top of the page. In some other implementations, an advertiser may select certain criteria for an ad that may need information about one or more ad slot parameters. For example, an advertiser may wish to have the ad displayed above-the-fold (the part of the web page that is in view upon initial rendering of the web page).

According to some implementations, ad slot rendering may cause measuring Java script code to be executed in the context of the main page before an ad request is made and after the page has loaded. This can facilitate performing measurements in real time or after a page has fully rendered, and reporting the results back to the server.

FIG. 1A illustrates an example system 100 for serving content items to a web page via a computer network such as network 105 according to some implementations of the present disclosure. The network 105 can include computer networks such as the Internet, local, metro, or wide area networks (WAN), intranets, and other communication networks such as mobile telephone networks. The network 105 can be used to access web pages that can be displayed on at least one user device 110, such as a laptop, desktop, tablet, personal digital assistants, smart phones, smart TVs, or portable computers. For example, via the network 105 a user device 110 can access web pages provided by the web page operator 115. In this example, a web browser of the user device 110 can access a web server of the web page operator 115 to retrieve a web page for display on a monitor of the user device 110. The web page operator 115 may include an entity that can operate a web page as well as the web page server that can communicate with the network 105 to make the web page available to the user device 110.

The system 100 can include at least one data processing system 120. The data processing system 120 can include at least one processor or logic device to communicate via the network 105 with at least one content provider 125 and at least one web page operator 115. The data processing system 120 can include at least one content item slot identification module 130, at least one measurement module 135, and at least one database 140. In some implementations, the data processing system 120 may include a content placement server.

In some implementations, the web page operator 115 can request content from the data processing system 120. The data processing system 120 may request content from the content provider 125 in response to this request for content. The data processing system 120 may select the content to provide to web page operator 115 based on a plurality of factors. In some other implementations, the data processing system 120 may instruct the content provider 125 to directly provide content to the web page operator 115. In some implementations, the data processing system 120 may retrieve one or more content, such as a plurality of advertisements, from content provider 125 and store the content in the database 140.

In some implementations, the data processing system 120 may obtain ad slot information via the computer network 105. The ad slot may be on the web page being viewed by the user device 110. The web page may be associated with the web page operator 115. For example, the data processing system 120 can obtain ad slot information such as at least one ad slot parameter, including, e.g., a unique ad slot id, ad slot position, browser document size, or ad slot length and width.

An ad slot code may be an identifier used by a data processing system 120 and/or an advertisement placement server. The ad slot code may be tied to various web operator and/or publisher settings. In some implementations, the data processing system 120 may use various other parameters to generate a unique ad slot id, including, e.g., the ad slot's location in the web page's document object model (DOM) tree.

In some implementations, the data processing system 120 may include an interface configured to receive a request via the network 105 to provide content for display in an ad slot of a web page. The data processing system 120 may receive the request in real-time, e.g., between the time that the user device 110 requests access to a web page of the web page operator 115 and the time that the web page operator 115 displays the web page on the user device 110.

In some implementations, the measurement module 135 can measure or otherwise obtain at least one parameter associated with the ad slot, and/or the results of rendering one or more ads (such as whether the one or more ads are truncated in the ad slot). For example, the measurement module 135 can inject a script into content that is being provided to the web page operator for display on the web page. In some implementations, the measurement module 135 can append a script into a rich media advertisement. A rich media advertisement may include, e.g., an HTML advertisement, or other multimedia advertisements that include one or more of text, audio, still images, animation, video, or interactive content. The script may be a Java script. The script can execute at the web page server of the web page, for example, to make the measurements.

In some implementations, the measurement module 135 may inject the script into all rich media content being provided for display to the user identifiers. In some other implementations, the measurement module 135 may inject the script into a predetermined percentage of rich media advertisements. For example, the measurement module 135 may inject the script into two percent of the rich media advertisements that are provided for display on a given web page or a given ad slot. Retrieving measurements from only a few percent of the requests may be sufficient to get a statistically significant sample of measurements. In another example, adding more processing to a web may slow the processes related to loading and interacting with the web page. As another example, the script may be measuring all ad slots continuously, even for those for which data already exist, in order to detect possible changes in web pages, e.g., a publisher moving an ad slot from the right side of the page to the left side of the page. Thus, in some implementations, the script may be injected as necessary to mitigate added unnecessary processing to a web page. For example, the script may be injected five percent, ten percent, fifty percent or more of the time. In some other implementations, the percentage of measurements per day may vary. For example, for certain web pages, the percentage may be higher due to the number of ad requests during a given time period, e.g., a day, an hour, a month. In some implementations, the measurement module 135 can automatically determine how many measurements are necessary during a given time period to get statistically significant data and vary the number of requests accordingly.

In some other implementations, the measurement module 135 can receive at least one parameter of the ad slot. For example, a web page server of the web page operator 115 can execute the Java script to determine one or more parameter of the ad slot. The Java script may combine the determined parameter with other available data and report it to the ad slot measurement module 135 via the network 105. For example, the ad slot measurement module 135 may receive the unique ad slot id of the ad slot and position data.

The system 120 can include a database 140 that stores one or more data about the ad slot. In some implementations, the database 140 can store the measurement results determined by the measurement module 135. In some other implementations, the database 140 may store the content provided by content provider 125. For example, the database 140 may store the advertisements provided to the web page operator 115. The database 140 may store the content items with the injected scripts.

In some implementations, the data processing system 120 may include a content item slot identification module 130. The content item slot identification module 130 can identify the type of ad slot that is requesting an advertisement based on one or more parameters. For example, the content item slot identification module 130 can identify whether the ad slot is a legacy ad slot not capable of running Java script at the time of ad request.

In some implementations, the web page operator 115 may request an ad for a given ad slot a plurality of times for renderings of the web page at a plurality of user devices 110. The measurement module 135 may inject a script into content a plurality of times, and receive a plurality of parameters about the ad slot and store it in the database 140.

The system 100 can include a database 140 designed and constructed to organize, store, retrieve, and transmit a plurality of data. The database 140 can be configured to interact with any component of system 100, data processing system 120, content item slot identification module 130, measurement module 135, content provider 125, web page operator 115, or user device 110.

Figure 1B:
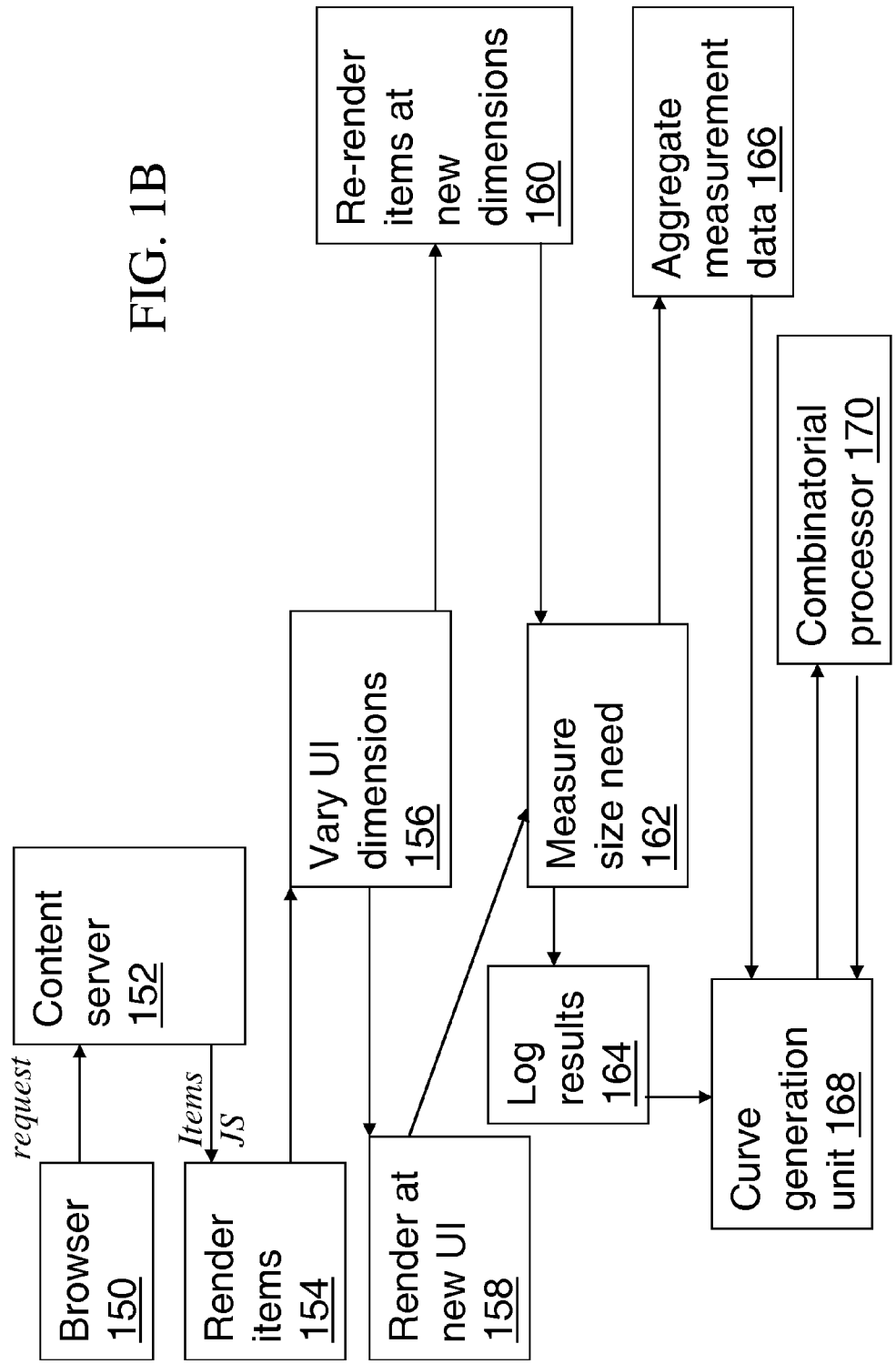
FIG. 1B is a block diagram illustrating an example method of measuring rendered content items using scripts, according to some implementations.

FIG. 1B is a block diagram illustrating some of the described implementations. A browser 150 may request content from a content server 152, which may in turn send content items together with Java scripts to the browser 150. Items 154 rendered on the browser may be experimented and/or iteratively rendered multiple times. For example, in an operation 156, the browser 150 may (invisibly) vary the UI dimensions of the content items 154 already returned, and re-render the items at new UI and/or dimensions in operations 158, 160. At block 162, the sizes needed at the various configurations for rendering the content items may be measured. The measured results may be logged at block 164. At block 166, the measurement data may be aggregated. The logged data may be used for future processing. For example, the logged data may be used to produce a set of statistical distributions for the space need for rendering the content items. At block 168, a curve generation unit may produce a set of "truncation curves" indicating a percentage of the content items being truncated in the slot, based on the statistical distributions. At block 170, a combinatorial processor may determine space needed for multiple content items based on the truncation curves that pertain to a single content item. For example, the combinatorial processor may combine several distribution sets to produce more truncation curves for situations where the ad slot is expected to show 2 ads, 3 ads, or 4 ads, etc.

FIG. 2 illustrates a flow diagram of a method 200 for distributing content items to a web page via a computer network in accordance with some illustrative implementations. The method 200 may include an operation of receiving, at a data processing system via the computer network, a request for a content item for display in a slot of a web page (block 202). For example, at least one processing module of a data processing system can receive, from a web page server, a request for content items (e.g., advertisements) to provide together with the main content of the web page for display to a user device. In some implementations, the request may be sent from an entity to place content on their web page, including, e.g., a web page operator. The request may be transmitted via a network and received by the data processing system such as a content placement server. In some implementations, the content may be received from a content provider and provided to the web page operator.

In some implementations, the request for content may be responsive to one or more actions made by a user device. For example, a user device may request access to a web page hosted by a web page operator. The web page may have one or more ad slots that need content. The web page operator may request content items (e.g., advertisements) from the system 120 that are suitable for the ad slot.

In some implementations, the request may be received by an advertisement placement server. The request can be made by the publisher of a web page. In some implementations, the request may be made in real-time, e.g., after a user device requests access to a web page and prior to the user device displaying the web page to on user device. A user identifier may be represented by an indicator for a browsing session. For example, a user identifier may be a cookie that identifies a browsing session, browser, or computing device that includes one or more processing modules.

In some implementation, the request for content may include additional information, such as information about the advertisement slot. In some implementations, the information includes a unique ad slot id, data about parameters related to the advertisement slot, or data used to retrieve relevant advertisements. In some implementations, the request may lack certain data. For example, the request may lack data about parameters of the advertisement slot, including, e.g., the unique advertisement slot id, parameter data, position data, or style data.

The method 200 may include obtaining, at the data processing system, measurement results of rendering content items from a plurality of user devices with a plurality of configurations (block 204). For example, the measurement results may be obtained from scripts running on the plurality of user devices. In some implementations, the method may include injecting the scripts into the content items. For example, the content items may be rich media HTML advertisements with Java scripts injected (e.g., appended, embedded, or linked) to the HTML codes. The Java scripts may be capable of executing in the browser (e.g., by the web server associated with the web page of the ad slot, on the user device, or by the browser) and retrieving data about one or more ad slot parameter.

In some implementations, the scripts, when executed, may determine the one or more parameter by reading parameters passed from the data processing system 120. In some other implementations, the Java scripts can use a web browser DOM manipulation API to traverse the DOM and request information including, e.g., size and location, from the standard Java script APIs available when running in a modern browser.

Method 200 can include operations associated with receiving at least one ad slot parameter. For example, at least one of a parameter about one or more ad slots, the web page, web browser, and user device may be received. The parameter data may be received via a URL or any other means of transmitting information from a web page operator to the system 100 via a computer network 105. In some implementations, the parameter data may include one or more identifier, including, e.g., the ad slot code of the ad slot. In some other implementations, the parameter data may be combined with other previously gathered data.

The scripts such as Java scripts may be injected into a predetermined percentage of selected advertisements for a given web page or ad slot. For example, the scripts may be injected into one or two percent of all selected rich media advertisements.

In some implementations, the scripts, when executed, may experiment with UI dimensions on the user devices, such as by varying the UI dimensions, fonts, and other parameters, while making measurements. By providing the content items including the scripts to a plurality of user devices, measurements can be obtained, with statistical significance, on the space need for various content items on various user devices. The measurement results may include, for example, at least one of a parameter of the slot, a parameter of the content item, a dimension of a UI, or a parameter of the plurality of configurations.

Method 200 may include determining a space need of the content items (block 206), and providing, via the computer network, the content item for rendering in the slot based on the determined space need (block 210). The content item may be rendered directly on a user device, for example. The space need may be represented by a probabilistic distribution indicating a percentage or probability of content items that are truncated when displayed in the slot, for example.

In some implementations, block 210 may include an operation of selecting a rich media advertisement for the ad slot. The rich media advertisement may be selected based on one or more advertisement criteria received from the advertisement request. For example, block 210 may include selecting the advertisement based on the content of the web page, including, e.g., keywords associated with the web page, semantic concepts, or content verticals (categories). In some other implementations, block 210 may include selecting the advertisement based on characteristics or past browsing behavior of the user identifier.

Multiple content items may be displayed within a single slot at the same time. Accordingly, in some implementations, a plurality of probabilistic distributions of space needs of a plurality of combinations of content items may be determined. For example, a plurality of combinations of content items may be rendered in an experiment slot to determine the plurality of probabilistic distributions. In some other implementations, a plurality of probabilistic distributions of space needs of multiple content items being displayed in a single slot may be determined by combining probabilistic distributions of single content items being displayed in the single slot.

In some implementations, block 210 may include selecting an advertisement for display based, at least in part, on an online advertisement bidding process. For example, a plurality of online advertisers may make a bid in an online auction for certain keywords. If one or more of those keywords are associated with the ad request for a web page, then the content placement server may be more likely to select an advertisement belonging to the highest bidder of one or more of those keywords. In one example, this advertisement may correspond to a rich media advertisement, including, e.g., an HTML advertisement, or other multimedia advertisements that include one or more of text, audio, still images, animation, video, or interactive content. In another example, the content placement server may select a non-rich media advertisement, e.g., an advertisement that consists of basic text.

The method 200 may include storing the measured data and the determined probabilistic distribution in a database (block 208). The stored data and distribution may be applied when other content items are requested. In some implementations, the stored data can be combined with previous measurements of parameters associated with the same ad slot code and stored in the database. In some other implementations, block 208 may include storing every measurement of a parameter received for the ad slot. Block 208 may include combining the parameters into one or more parameter metric. The parameter metric may include, e.g., an average parameter, standard deviation, variance, range, or any other metric that is indicative of a statistic of a plurality of parameters.

According to some implementations, in an operation 212, an appearance of the content item in the slot may be optimized based on the probabilistic distribution. In an operation 214, the number of a plurality of content items in the slot may be maximized based on the probabilistic distribution. As such, the user experience may be improved, and the web page space may be optimally monetized.

In some implementations, method 200 can include the operations of selecting a parameter-dependent advertisement based on an advertisement selection criteria. Ad selection criteria may include, e.g., interest categories, demographics, geography, semantic concepts, or content verticals. Ad criteria may include the type of ad slot. In some implementations, method 200 can include the act of a content provider selecting their content to an ad slot that has a parameter corresponding to a certain type of ad.

Figure 3:
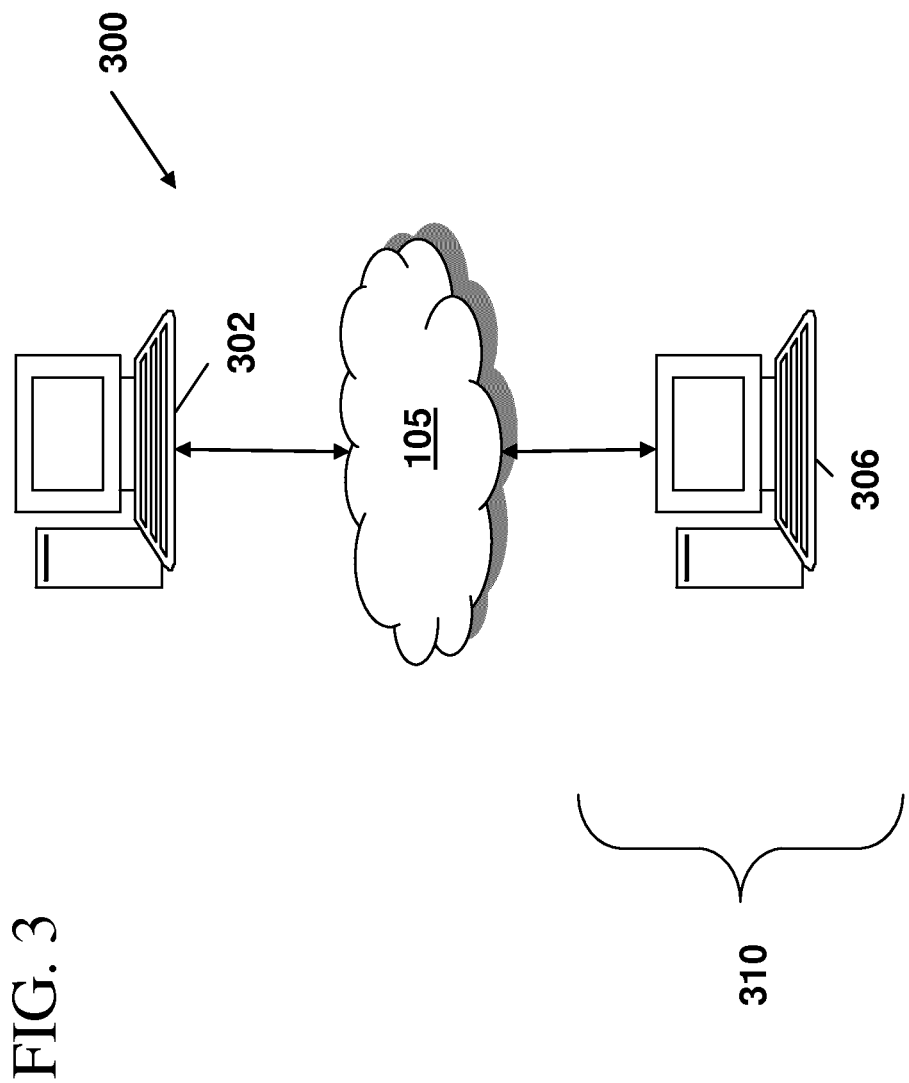
FIG. 3 shows an illustration of an example network environment comprising client machines in communication with remote machines in accordance with some implementations.

The system 100 and its components may include hardware elements, such as one or more processors, logic devices, or modules. FIG. 3 illustrates an example implementation of a network environment 300, in which the system 100 and method 200 can operate. The network environment 300 may include one or more clients 302 that can be referred to as local machine(s) 302, client(s) 302, client node(s) 302, client machine(s) 302, client computer(s) 302, client device(s) 302, endpoint(s) 302, or endpoint node(s) 302 in communication with one or more servers 306 that can be referred to as server(s) 306, node 306, or remote machine(s) 306 via one or more networks 105. In some implementations, a client 302 has the capacity to function as both a client node seeking access to resources provided by a server and as a server providing access to hosted resources for other clients 302.

Although FIG. 3 shows a network 105 between the clients 302 and the servers 306, the clients 302 and the servers 306 may be on the same network 105. The network 105 can be a local-area network (LAN), such as a company Intranet, a metropolitan area network (MAN), or a wide area network (WAN), such as the Internet or the World Wide Web. In some implementations, there may be multiple networks 105 between the clients 105 and the servers 306. For example, the network 105 may be a public network, a private network, or may include combinations of public and private networks.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some implementations, the network 105 may include a wireless link, such as an infrared channel or satellite band. The topology of the network 105 may include a bus, star, or ring network topology. The network may include mobile telephone networks utilizing any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). In some implementations, different types of data may be transmitted via different protocols. In other implementations, the same types of data may be transmitted via different protocols.

In some implementations, the system 100 may include multiple, logically-grouped servers 306. In one of these implementations, the logical group of servers may be referred to as a server farm or a machine farm 310. In another of these implementations, the servers 306 may be geographically dispersed. In other implementations, a machine farm 310 may be administered as a single entity. In still other implementations, the machine farm 310 includes a plurality of machine farms 310. The servers 306 within each machine farm 310 can be heterogeneous—one or more of the servers 306 or machines 306 can operate according to one type of operating system platform.

In some implementations, servers 306 in the machine farm 310 may be stored in high-density rack systems, along with associated storage systems, and located in an enterprise data center. In this implementation, consolidating the servers 306 in this way may improve system manageability, data security, the physical security of the system, and system performance by locating servers 306 and high performance storage systems on localized high performance networks. Centralizing the servers 306 and storage systems and coupling them with advanced system management tools allows more efficient use of server resources.

The servers 306 of each machine farm 310 do not need to be physically proximate to another server 306 in the same machine farm 310. Thus, the group of servers 306 logically grouped as a machine farm 310 may be interconnected using a wide-area network (WAN) connection or a metropolitan-area network (MAN) connection. For example, a machine farm 310 may include servers 306 physically located in different continents or different regions of a continent, country, state, city, campus, or room. Data transmission speeds between servers 306 in the machine farm 310 can be increased if the servers 306 are connected using a local-area network (LAN) connection or some form of direct connection. Additionally, a heterogeneous machine farm 310 may include one or more servers 306 operating according to a type of operating system, while one or more other servers 306 execute one or more types of hypervisors rather than operating systems. In these implementations, hypervisors may be used to emulate virtual hardware, partition physical hardware, virtualize physical hardware, and execute virtual machines that provide access to computing environments.

Management of the machine farm 310 may be de-centralized. For example, one or more servers 306 may comprise components, subsystems and modules to support one or more management services for the machine farm 310. In one of these implementations, one or more servers 306 provide functionality for management of dynamic data, including techniques for handling failover, data replication, and increasing the robustness of the machine farm 310. Each server 306 may communicate with a persistent store and, in some implementations, with a dynamic store.

Server 306 may include a file server, application server, web server, proxy server, appliance, network appliance, gateway, gateway, gateway server, virtualization server, deployment server, secure sockets layer virtual private network ("SSL VPN") server, or firewall. In some implementations, the server 306 may be referred to as a remote machine or a node.

The client 302 and server 306 may be deployed as or executed on any type and form of computing device, such as a computer, network device or appliance capable of communicating on any type and form of network and performing the operations described herein.

Figure 4:
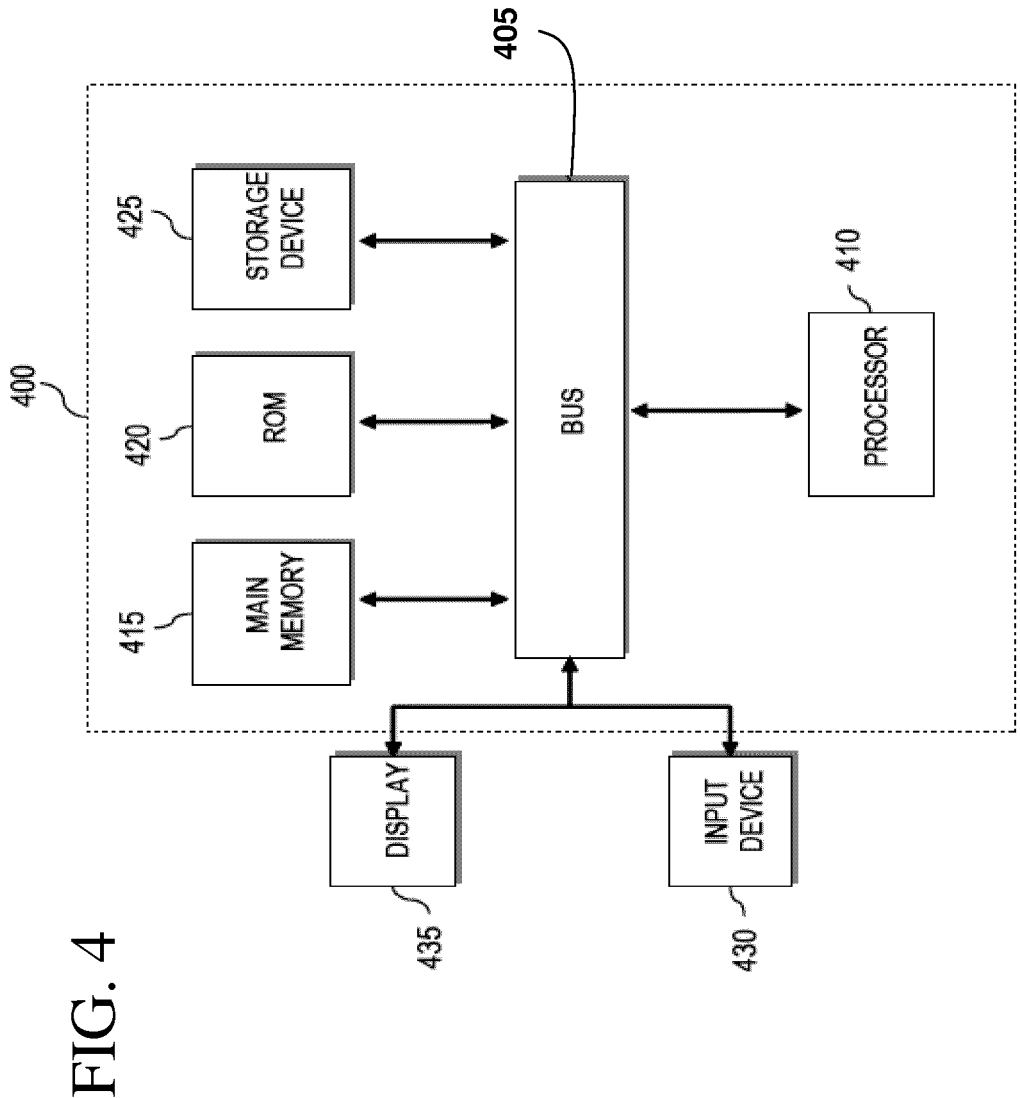
FIG. 4 is a block diagram illustrating an architecture for a computer system that may be employed to implement various elements of the systems and methods in accordance with some implementations.

FIG. 4 is a block diagram of a computing system or device 400 in accordance with some illustrative implementations. The computing system or device 400 can be used to implement the system 100, user device 110, web page operator 115, data processing system 120, content provider 125, content item slot identification module 130, content item slot measurement module 135, and database 140. The computing system 400 may include a bus 405 or other communication component for communicating information and a processor 410 or processing module coupled to the bus 405 for processing information. The computing system 400 can include one or more processors 410 or processing modules coupled to the bus for processing information. The computing system 400 includes main memory 415, such as a random access memory (RAM) or other dynamic storage device, coupled to the bus 405 for storing information, and instructions to be executed by the processor 410. Main memory 415 can be used for storing position information, temporary variables, or other intermediate information during execution of instructions by the processor 410. The computing system 400 may include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In some other implementations, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a non-transitory computer-readable medium, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can be, or be included in, one or more separate components or media (e.g., multiple CDs, disks, or other storage devices). Accordingly, the computer storage medium is both tangible and non-transitory.

The operations described in this specification can be performed by a data processing apparatus on data stored on one or more computer-readable storage devices or received from other sources.

The term "data processing apparatus" or "computing device" may encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. A processor can receive instructions and data from a read-only memory or a random access memory or both. The essential elements of a computer are a processor for performing actions in accordance with instructions and one or more memory devices for storing instructions and data. A computer may include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can be implemented in combination in a single implementation. Conversely, various features described in the context of a single implementation can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether and/or how to receive content from the content server that may be more relevant to the user. In addition, certain data may be anonymized in one or more ways before it is stored or used, so that personally identifiable information is removed when generating parameters (e.g., demographic parameters). For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

What is claimed is:

1. A method of distributing content items to a web page via a computer network, the method comprising:
    obtaining, using one or more data processing systems, measurement results for a content item from a plurality of user devices based on rendering the content item for a plurality of configurations of one or more of a font size, a font face, a font style, or user interface dimensions, wherein the measurement results are obtained from scripts running on the plurality of user devices;
    generating, by the one or more data processing systems, a statistical distribution indicative of spatial dimensions for the content item based on the measurement results from the plurality of user devices;
    generating, by the one or more data processing systems, a truncation curve for the content item based on the generated statistical distribution of spatial dimensions, wherein the truncation curve is indicative of a percentage of renderings of the content item that are truncated for a parameter value of a slot;
    receiving, at the one or more data processing systems via the computer network, a request for a content item for display in a slot of a web page;
    selecting, by the one or more data processing systems, the content item responsive to the request and based on the generated truncation curve; and
    transmitting, via the computer network, the content item for rendering in the slot.

2. The method of claim 1, further comprising:
    injecting a script into the content item; and
    providing the content item with the script to the plurality of user devices.

3. The method of claim 1, wherein the measurement results comprise at least one of a parameter of the slot, a parameter of the content item, a dimension of a user interface, or a parameter of the plurality of configurations.

4. The method of claim 1, further comprising storing the measurement results in a database.

5. The method of claim 1, further comprising:
    rendering a plurality of combinations of content items including the content item in an experiment slot; and determining a plurality of probabilistic distributions of space needs of the plurality of combinations.

6. The method of claim 1, further comprising determining a plurality of probabilistic distributions of space need for multiple content items including the content item displayed in a single slot by combining probabilistic distributions of each of the content items displayed in the single slot.

7. The method of claim 1, further comprising:
optimizing an appearance of the content item in the slot based on the statistical distribution.

8. The method of claim 1, further comprising:
maximizing a number of a plurality of content items including the content item in the slot based on the statistical distribution.

9. The method of claim 1, wherein the scripts are configured to vary user interface dimensions on the plurality of user devices.

10. A system for distributing content items to a web page via a computer network, the system comprising:
one or more data processors; and one or more storage devices storing instructions that, when executed by the one or more data processors, cause the one or more data processors to perform operations comprising:
obtaining measurement results for a plurality of content items from a plurality of user devices based on rendering each of the plurality of content items for a plurality of configurations, wherein the measurement results are obtained from a script running on a user device of the plurality of user devices when a content item of the plurality of content items is served, wherein the script is configured to vary interface dimensions;
generating a truncation curve for each of the plurality of content items based on the measurement results;
receiving a request for a content item for display in the slot of a web page;
selecting a content item of the plurality of content items responsive to the request and based on the generated truncation curve for the content item; and
transmitting, via the computer network, the content item for rendering in the slot.

11. The system of claim 10, wherein the instructions cause the one or more data processors to perform operations comprising:
injecting the script into the content item of the plurality of content items; and
transmitting the content item of the plurality of content items with the script to the user device of the plurality of user devices.

12. The system of claim 10, wherein the measurement results comprise at least one of a parameter of the slot, a parameter of the content item, a dimension of a user interface, or a parameter of the plurality of configurations.

13. The system of claim 10, wherein the instructions cause the one or more data processors to perform operations comprising storing the measurement results in a database.

14. The system of claim 10, wherein the instructions cause the one or more data processors to perform operations comprising:
rendering a plurality of combinations of content items in an experiment slot; and
determining a plurality of probabilistic distributions of space needs of the plurality of combinations.

15. The system of claim 10, wherein the instructions cause the one or more data processors to perform operations comprising:

determining a plurality of probabilistic distributions of space needs of multiple content items being displayed in a single slot by combining probabilistic distributions of single content items being displayed in the single slot.

16. The system of claim 10, wherein the instructions cause the one or more data processors to perform operations comprising:
optimizing an appearance of the content item in the slot based on the generated truncation curve; or
maximizing a number of a plurality of content items for display in the slot based on the generated truncation curves of each of the plurality of content item.

17. A non-transitory computer readable storage device storing instructions that, when executed by one or more data processors, cause the one or more data processors to perform operations comprising:
receiving a request for a content item for display in a slot of a web page;
obtaining measurement results for a content item from a plurality of user devices based on rendering the content item for a plurality of configurations, wherein the measurement results are obtained from scripts running on the plurality of user devices when the content item was previously served;
generating a statistical distribution indicative of spatial dimensions for the content item based on the measurement results from the plurality of user devices for the plurality of configurations;
generating a truncation curve for the content item based on the generated statistical distribution of spatial dimensions;
determining a space need of the content item based on the generated truncation curve for the content item and a parameter for the slot; and
providing, via the computer network, the content item for rendering in the slot based on the determined space need.

18. The non-transitory computer readable storage device of claim 17, wherein the instructions further cause the one or more data processors to perform operations comprising:
injecting a script into the content item, wherein providing the content item includes providing the injected script.

19. The non-transitory computer readable storage device of claim 17, wherein the measurement results comprise at least one of a parameter of the slot, a parameter of the content item, a dimension of a user interface, or a parameter of the plurality of configurations, wherein the instructions cause the one or more data processors to perform operations comprising:
storing the measurement results in a database; and
determining a probabilistic distribution indicative of spatial dimensions for multiple content items displayed in a single slot by combining the generated probabilistic distributions of each of the multiple content items including the content item.

20. The non-transitory computer readable storage device of claim 17, wherein the instructions further cause the one or more data processors to perform operations comprising:
optimizing an appearance of the content item in the slot based on the generated truncation curve for the content item; and
maximizing a number of a plurality of content items including the content item for the slot based on the generated truncation curve for the content item.

* * * * *